May 20, 1930.  B. T. ANDREN  1,759,339
THREADED NUT FOR SECURING METAL PARTS
Original Filed July 15, 1927
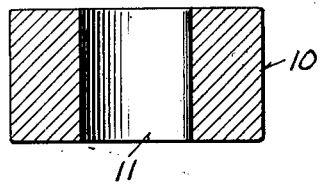
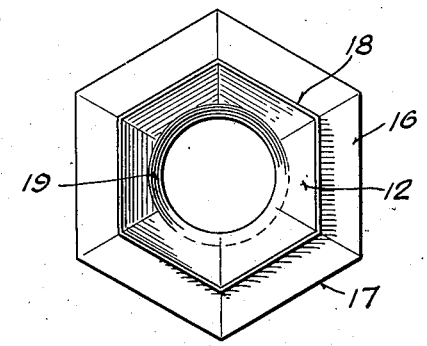
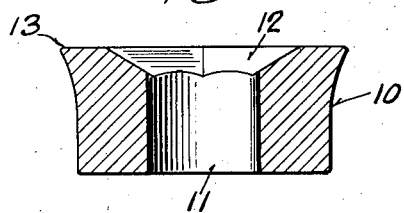
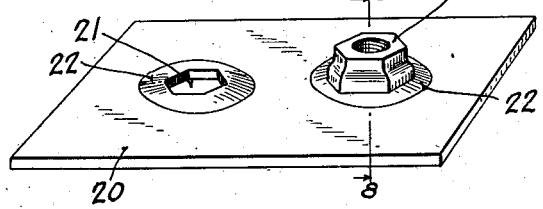
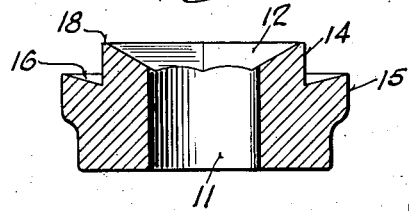
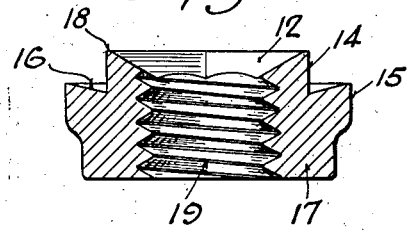
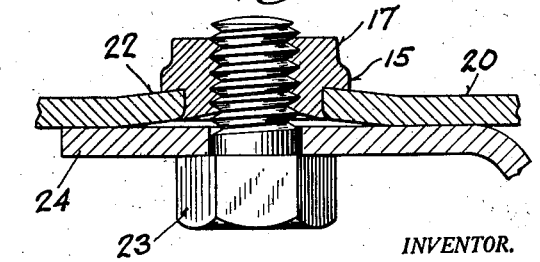
INVENTOR.
BIRGER T. ANDREN
BY
ATTORNEY.

Patented May 20, 1930

1,759,339

UNITED STATES PATENT OFFICE

BIRGER TORVALD ANDREN, OF MILWAUKEE, WISCONSIN, ASSIGNOR TO A. O. SMITH CORPORATION, OF MILWAUKEE, WISCONSIN, A CORPORATION OF NEW YORK

THREADED NUT FOR SECURING METAL PARTS

Original application filed July 15, 1927, Serial No. 205,963. Divided and this application filed February 23, 1929. Serial No. 341,998.

The present invention forms a division of the subject matter disclosed in my copending application, Serial No. 205,963, filed July 15, 1927, now Patent 1,705,463 dated Mar. 12, 1929.

The invention relates to an improvement in threaded nuts for securing metal parts.

In many classes of work in making the desired connections, the nuts are placed loosely in or over the openings in the plate and there held by hand or by specially designed mechanism while the bolt or screw is being inserted. This practice involves a very tedious and time consuming operation.

One of the objects of the present invention is to provide specially built nuts adapted to be attached to metal plates or other parts, so that such nuts will be in proper position and be held against rotation at the time that the bolts or screws are entered into the threaded holes thereof.

A further object of the invention is to provide a specially shaped nut adapted to be attached to metal plates so as to create a yielding resistance to the stress upon the screws or bolts, in order to prevent the joint at the nut from bending and the nut from becoming loose.

The invention may be more readily understood by reference to the accompanying drawings in which the views are as follows:

Figure 1 is an axial, central, sectional view of the nut blank.

Fig. 2 is a like view after the blank has been subjected to the first upsetting operation.

Fig. 3 is a like view after the blank has been subjected to the final shaping operation.

Fig. 4 is a like view of the nut as completed by the tapping operation.

Fig. 5 is a plane view of the nut as shown in Fig. 4.

Fig. 6 is a perspective view of a plate showing the outline of one of the perforations in which the shank of the hexagonal nut is received, together with the embossment thereon, and also a hexagonal nut as secured to the plate.

Fig. 7 is a like view but of a cylindrical nut.

Fig. 8 is an enlarged sectional view through the plate and nut, on the line 8—8 of Fig. 6, showing the embossment and concavity formed in the plate and the manner of anchoring the nut in the perforation of the plate without disturbing the thread of the nut together with a tap screw attaching a part to the plate.

In the drawings, the numeral 10 indicates a nut blank which may be produced by punching the same from a metal plate of the desired gauge or by cutting from bar stock. The nut blank may be cylindrical or polygonal and is perforated axially at 11, in a suitable manner as shown in Fig. 1. The nut blank 10 is then subjected to the action of upsetting dies to form a depression or recess 12 which flares outwardly from the perforation 11 at one side of the blank. At the time the displacement of the metal occurs in the formation of the depression 12, the adjacent metal is moved radially to form the transverse enlargement 13 on the end of the nut blank as shown in Fig. 2.

The blank is then subjected to the action of another set of dies which shape the recessed end of the blank to form a polygonal shank 14 of reduced dimensions, and a circumferential rib 15 about the median line of the nut, with a circular shoulder 16, at the base of the shank adjacent said rib, as shown in Fig. 3. The face of the shoulder 16 which extends transversely of the axis of the nut is preferably dished. The nut 17 is then completed by tapping the perforation 11 therein, so as to provide the same with a thread as at 19. The end of the shank of the nut tapers inwardly from the marginal edge or rim 18 directly to the threaded opening 19 and thus constitutes a centering means for the leading end of the attaching screw or bolt and conducing to a quicker engagement of the screw with the threads of the nut.

In Figs. 6 and 7, the numeral 20 indicates a metal plate suitably perforated as at 21 for the reception of the shank 14 of the nut. The contour of the perforation 21 in the plate 20 should conform substantially to the exterior configuration of the shank 14 of the nut, so that when assembled, the irregular contours of these parts will interengage to prevent rotation of the nut while the threaded end of the screw is entered therein.

Referring to Figs. 6, 7, and 8, it will be seen that the metal of the plate 20 surrounding the perforation 21 therein is displaced laterally from the plane of the plate. This condition is produced in the punching operation, and the slight embossment 22 upon one side of the plate is adapted to be received in the dish of the shoulder 16 on the nut, when the shank 14 is passed through the perforation 21. The upstanding edge or rim 18 of the shank is then upset and an outward flow of the metal thereof takes place and is caused to spread into close engagement with the walls of the perforation 21 in the plate with a wedging action. At the same time, the dished shoulder 16 of the nut is brought into close engagement with the face of the embossment 22 and a good contact is thereby effected. Thus the projecting edge or rim 18 of the shank is broken down and made to lie flush with the surface and within the concavity formed. The thread of the nut is not disturbed, inasmuch as the thread, extending only to the bottom of the depression or recess 12 is removed from the region of pressure during the upsetting operation.

The construction thus provided may be put to its intended uses without further threading the nut. When placed in use, the embossment on the plate 20 is placed under compression, and so creates a yielding resistance to the stress upon the shoulder or screw. This prevents the bolt from rotating and the nut from coming loose.

Fig. 8 shows the use and operation of the invention, and illustrates how a screw is entered into the nut 15 to secure an attachment 24 to the plate 20 and place the connection under tension, the pull upon the nut being against the displaced portion of the plate, the concavity providing a clearance permitting movement under compression. Deforming the plate 20 in the manner described and placing the same under compression causes it to act as a nutlock or spring washer.

The simple operations incident to the production of the invention contribute to the economical use of the latter. While a specific use of the invention is hereinbefore set forth, it is understood that the invention may have various modifications within the scope of the claims.

Having thus described my invention, what I claim and desire to secure by Letters Patent is:

1. An article of manufacture, a nut to be mounted in a plate-like member, the said nut comprising a body portion having a threaded opening extending therethrough, and a shank having a cross section other than circular to constitute means for holding the nut against turning in the plate-like member, the said body portion having a dished shoulder adjacent and surrounding the shank to form an undercut recess at one end of the nut, the length of the shank being but slightly greater than the thickness of the said plate-like member.

2. An article of manufacture, a nut to be mounted in a plate-like member, the said nut comprising a body portion having a threaded opening extending therethrough, and a shank to engage the plate-like member and having a length but slightly greater than the thickness of the said member, the said body portion of the nut having a dished shoulder adjacent and surrounding the shank to form an undercut recess to receive the plate-like member.

3. An article of manufacture, a nut to be used in interlocked engagement with a plate-like member and to cooperate therewith to function as a nut and yielding nut-locking or retaining means, the nut comprising a body-portion having a threaded opening therethrough and a shank of cross-section other than circular for interlocking engagement with the said plate-like member, the said body portion of the nut having a dished shoulder adjacent the shank and surrounding the same to provide an undercut recess to receive the plate-like member.

4. As an article of manufacture, a threaded nut comprising a body portion having a threaded opening extending therethrough and a shank of cross section other than circular on one side of said body portion adapted to be inserted into a complementary opening in a plate-like member with which the nut is to be interlocked, said body portion having a dished shoulder adjacent said shank for receiving said plate-like member, and said shank being adapted to hold said plate-like member in the dished recess of the shoulder to thereby interlock said nut with the plate-like member and prevent relative turning thereof.

In testimony whereof, I have signed my name at Los Angeles, Calif., this fifth day of February, 1929.

BIRGER TORVALD ANDREN.